(12) United States Patent
Wang (10) Patent No.: US 11,200,381 B2
(45) Date of Patent: Dec. 14, 2021

(54) SOCIAL CONTENT RISK IDENTIFICATION (71) Applicant: Advanced New Technologies Co., Ltd., Grand Cayman (KY)

(72) Inventor: Chuan Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/808,704

(22) Filed: Mar. 4, 2020

(65) Prior Publication Data

US 2020/0202076 A1   Jun. 25, 2020

Related U.S. Application Data (63) Continuation of application No. PCT/CN2018/116093, filed on Nov. 19, 2018.

(30) Foreign Application Priority Data

Dec. 28, 2017 (CN) ........................... 2017 1 1458033

(51) Int. Cl.
*G06F 40/30* (2020.01)
*G06N 20/00* (2019.01)
*G06K 9/62* (2006.01)
*H04L 12/58* (2006.01)

(52) U.S. Cl.
CPC ........... *G06F 40/30* (2020.01); *G06K 9/6257* (2013.01); *G06N 20/00* (2019.01); *H04L 51/046* (2013.01); *H04L 51/32* (2013.01)

(58) Field of Classification Search
None
See application file for complete search history.

(56) References Cited

U.S. PATENT DOCUMENTS

| 9,373,267 | B2 | 6/2016 | Sadeh-Koniecpol et al. |
| 9,779,364 | B1 | 10/2017 | Hoover et al. |
| 9,864,956 | B1* | 1/2018 | Sai ........................... G06N 3/02 |
| 10,063,434 | B1* | 8/2018 | Khanal ................... H04L 43/08 |

(Continued)

FOREIGN PATENT DOCUMENTS

| CN | 105955951 | 9/2016 |
| CN | 106959946 | 7/2017 |

(Continued)

OTHER PUBLICATIONS

Li et al. ("Poster: Practical Fraud Transaction Prediction" CCS's 17, Oct. 30-Nov. 3, 2017, Dallas, TX, USA, pp. 2535-2537).*

(Continued)

*Primary Examiner* — Thuykhanh Le
(74) *Attorney, Agent, or Firm* — Fish & Richardson P.C.

(57) ABSTRACT

One or more implementations of the present specification provide a social content risk identification method. Social content data to be identified is obtained. Features of the social content data are extracted, including a plurality of features of at least one of social behavior records or social message records in the social content data. The features are expanded by generating dimension-extended features using a tree structured machine learning model. The social content data is classified as risky social content data by processing the dimension-extended features using a deep machine learning model.

26 Claims, 5 Drawing Sheets

(56) References Cited

U.S. PATENT DOCUMENTS

| | | | |
|---|---|---|---|
| 10,181,032 B1* | 1/2019 | Sadaghiani | G06N 3/08 |
| 10,387,161 B2* | 8/2019 | Tian | G06N 20/00 |
| 10,607,134 B1* | 3/2020 | Cosic | G06N 20/00 |
| 10,623,426 B1* | 4/2020 | Yumer | G06N 20/10 |
| 2002/0133721 A1 | 9/2002 | Adjaoute | |
| 2014/0058723 A1* | 2/2014 | Shen | G06F 40/247 704/9 |
| 2014/0199663 A1* | 7/2014 | Sadeh-Koniecpol | G06F 21/56 434/118 |
| 2015/0095022 A1* | 4/2015 | Xu | G06K 9/00456 704/10 |
| 2015/0142446 A1* | 5/2015 | Gopinathan | G06Q 40/025 704/270 |
| 2015/0170295 A1* | 6/2015 | Shen | G06Q 50/01 705/319 |
| 2015/0199010 A1* | 7/2015 | Coleman | A61B 5/0024 345/156 |
| 2015/0213798 A1* | 7/2015 | Xiao | G10L 25/60 704/246 |
| 2016/0086600 A1* | 3/2016 | Bauer | G10L 15/16 704/202 |
| 2016/0132886 A1* | 5/2016 | Burke | G06Q 20/3224 705/44 |
| 2016/0140956 A1* | 5/2016 | Yu | G10L 15/16 704/240 |
| 2016/0300059 A1 | 10/2016 | Abrams et al. | |
| 2017/0083920 A1* | 3/2017 | Zoldi | G06N 20/00 |
| 2017/0124199 A1* | 5/2017 | Fu | G06F 16/9535 |
| 2017/0124472 A1* | 5/2017 | Fu | G06Q 30/02 |
| 2017/0213145 A1* | 7/2017 | Pathak | G06N 7/005 |
| 2017/0237773 A1* | 8/2017 | Wallace | H04L 63/123 726/22 |
| 2017/0354105 A1* | 12/2017 | Polavarapu | A01H 1/02 |
| 2017/0359362 A1* | 12/2017 | Kashi | G06N 20/00 |
| 2017/0365149 A1* | 12/2017 | Ten Kate | G08B 29/185 |
| 2017/0372071 A1* | 12/2017 | Saxe | G06N 3/04 |
| 2018/0025071 A1* | 1/2018 | Ideses | G06N 20/00 707/738 |
| 2018/0041528 A1* | 2/2018 | Machlica | G06F 17/16 |
| 2018/0041536 A1* | 2/2018 | Berlin | G06F 21/56 |
| 2018/0046926 A1* | 2/2018 | Achin | G06Q 10/04 |
| 2018/0060728 A1* | 3/2018 | Shan | G06N 5/003 |
| 2018/0060738 A1* | 3/2018 | Achin | G06Q 10/04 |
| 2018/0060744 A1* | 3/2018 | Achin | G06N 5/02 |
| 2018/0092547 A1* | 4/2018 | Tzvieli | A61B 5/6814 |
| 2018/0095450 A1* | 4/2018 | Lappas | B33Y 10/00 |
| 2018/0096439 A1* | 4/2018 | Davies | G06Q 30/04 |
| 2018/0103903 A1* | 4/2018 | Tzvieli | G02B 27/0172 |
| 2018/0103913 A1* | 4/2018 | Tzvieli | G06K 9/3233 |
| 2018/0107935 A1* | 4/2018 | Jeon | G08G 1/20 |
| 2018/0114216 A1* | 4/2018 | Joseph | G06Q 20/36 |
| 2018/0191770 A1* | 7/2018 | Nachenberg | G06F 21/554 |
| 2018/0197089 A1* | 7/2018 | Krasser | G06F 21/56 |
| 2018/0198800 A1* | 7/2018 | Krasser | H04L 63/145 |
| 2018/0218256 A1* | 8/2018 | Raviv | G06N 3/088 |
| 2018/0232902 A1* | 8/2018 | Albadawi | G06F 1/3206 |
| 2018/0253657 A1* | 9/2018 | Zhao | G06N 20/00 |
| 2018/0253661 A1* | 9/2018 | Strauss | G06Q 30/0269 |
| 2018/0253839 A1* | 9/2018 | Zur | G06T 7/0012 |
| 2018/0276560 A1* | 9/2018 | Hu | G06N 20/00 |
| 2018/0284763 A1* | 10/2018 | Hernandez Sanchez | G06Q 50/30 |
| 2018/0284770 A1* | 10/2018 | VandenBerg, III | G08G 1/0133 |
| 2018/0285764 A1* | 10/2018 | Hu | H04L 67/306 |
| 2018/0285818 A1* | 10/2018 | Soltani | G06F 16/9024 |
| 2018/0299841 A1* | 10/2018 | Appu | G05B 13/027 |
| 2018/0307912 A1* | 10/2018 | Selinger | G06K 9/78 |
| 2018/0324196 A1* | 11/2018 | Rao | H04L 67/02 |
| 2018/0324213 A1* | 11/2018 | Borlick | G06N 20/00 |
| 2018/0330201 A1* | 11/2018 | Witbrock | G06K 9/6256 |
| 2019/0007433 A1* | 1/2019 | McLane et al. | G06N 20/00 |
| 2019/0014133 A1* | 1/2019 | David | G06N 3/0454 |
| 2019/0026466 A1* | 1/2019 | Krasser | G06F 21/565 |
| 2019/0034483 A1* | 1/2019 | Millius | G06F 16/335 |
| 2019/0050750 A1* | 2/2019 | Le | G06F 16/9535 |
| 2019/0065986 A1* | 2/2019 | Witbrock | G06N 20/20 |
| 2019/0073596 A1* | 3/2019 | Hui | G06N 20/00 |
| 2019/0102917 A1* | 4/2019 | Bishop | G06T 1/20 |
| 2019/0108338 A1* | 4/2019 | Saxe | G06F 21/565 |
| 2019/0129705 A1* | 5/2019 | Bulut | G06F 21/50 |
| 2019/0130074 A1* | 5/2019 | Itu | G06K 9/4604 |
| 2019/0147350 A1* | 5/2019 | Bai | G06Q 10/04 706/25 |
| 2019/0149565 A1* | 5/2019 | Hagi | G06N 20/00 726/23 |
| 2019/0155952 A1* | 5/2019 | Tang | G06F 16/9024 |
| 2019/0164080 A1* | 5/2019 | Stefani | G06N 3/02 |
| 2019/0166150 A1* | 5/2019 | Bulut | H04L 51/02 |
| 2019/0172147 A1* | 6/2019 | Ward | G06Q 40/08 |
| 2019/0197069 A1* | 6/2019 | Fan | G06F 16/9535 |
| 2019/0251374 A1* | 8/2019 | Sakai | G06T 7/70 |
| 2019/0259144 A1* | 8/2019 | Pathapati | G06T 7/0002 |
| 2020/0160225 A1* | 5/2020 | Sun | G06Q 10/06 |
| 2020/0184072 A1* | 6/2020 | Ikeda | G06F 11/34 |
| 2020/0231466 A1* | 7/2020 | Lu | C02F 3/006 |
| 2020/0327989 A1* | 10/2020 | Kuenen | G16H 50/30 |

FOREIGN PATENT DOCUMENTS

| | | |
|---|---|---|
| CN | 107180071 | 9/2017 |
| CN | 107180077 | 9/2017 |
| CN | 107220845 | 9/2017 |
| CN | 107222865 | 9/2017 |
| CN | 107360152 | 11/2017 |
| CN | 108346107 | 7/2018 |
| TW | 201705034 | 2/2017 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Appln. No. PCT/CN2018/116093, dated Feb. 20, 2019, 10 pages (with partial English translation).

Extended European Search Report in European Patent Application No. 18894495.3, dated Jun. 3, 2020, 9 pages.

Rushin et al., "Horse race analysis in credit card fraud—deep learning, logistic regression, and Gradient Boosted Tree," 2017 Systems and Information Engineering Design Symposium (SIEDS), IEEE, 2017, pp. 117-121.

PCT International Preliminary Report on Patentability in International Application No. PCT/CN2018/116093, dated Jun. 30, 2020, 9 pages (with English translation).

Li et al., "POSTER: Practical Fraud Transaction Prediction.", The 2017 ACM SIGSAC Conference: 2535-2537, 2017.

* cited by examiner

SOCIAL CONTENT RISK IDENTIFICATION

CROSS-REFERENCE TO RELATED APPLICATIONS

This application is a continuation of PCT Application No. PCT/CN2018/116093, filed on Nov. 19, 2018, which claims priority to Chinese Patent Application No. 201711458033.0, filed on Dec. 28, 2017, and each application is hereby incorporated by reference in its entirety.

TECHNICAL FIELD

The present specification relates to the technical field of computer software, and in particular, to a social content risk identification method and device and equipment.

BACKGROUND

With the rapid development of computer technologies and Internet technologies, more social activities are conducted on the Internet, including but not limited to forum communication, instant messaging, and online transaction. Data such as behavior records generated and corpora published or disseminated in the activities is referred to as social content.

In actual applications, some social content is risky, which may affect the Internet experience of users, and seriously threaten cyber security and even real social security, such as violence, terrorism or political misconducts or misstatements.

In the existing technology, some key words are often set based on experience, and risk identification of social content is performed based on matching of key words.

Based on the existing technology, a more reliable solution for social content risk identification is needed.

SUMMARY

Implementations of the present specification provide a social content risk identification method and device and equipment, to provide a more reliable solution for social content risk identification.

To alleviate the previous technical problem, the implementations of the present specification are implemented as follows:

An implementation of the present specification provides a social content risk identification method, including: obtaining social content data to be identified; extracting features of at least one of social behaviors or social corpora in the social content data, and inputting the features into a tree structured machine learning model for processing to obtain features of dimension extension; and identifying whether the social content data is risky by inputting the features of dimension extension into a deep machine learning model for processing.

An implementation of the present specification provides a social content risk identification device, including: an acquisition module, configured to obtain social content data to be identified; an extraction module, configured to extract features of at least one of social behaviors or social corpora in the social content data, and input the features into the tree structured machine learning model for processing to obtain features of dimension extension; and an identification module, configured to identify whether the social content data is risky by inputting features of the dimension extension into a deep machine learning model for processing.

An implementation of the present specification provides a social content risk identification device, including: at least one processor, and at least one memory communicates and connects to the at least one processor, where the memory stores instructions that can be executed by the at least one processor, and the instructions are executed by the at least one processor to enable the at least one processor to: obtain social content data to be identified; extract features of at least one of social behaviors or social corpora in the social content data, and inputting the features into a tree structured machine learning model for processing to obtain features of dimension extension; and identify whether the social content data is risky by inputting the features of dimension extension into a deep machine learning model for processing.

The described at least one technical solution adopted in some implementations of the present specification can achieve the following beneficial effects: compared with original features, the features of dimension extension can more accurately reflect the social content data, so that the data can be easily processed by using the deep machine learning model including a large quantity of input nodes, such as deep neural networks (DNN), and therefore, whether the social content data is risky can be identified more reliably.

BRIEF DESCRIPTION OF DRAWINGS

To describe technical solutions in implementations of the present specification or in the existing technology more clearly, the following briefly introduces accompanying drawings required for describing the implementations or in the existing technology. Apparently, these accompanying drawings in the following description are merely some of the implementations described in the present specification. For a person of ordinary skill in the art, other accompanying drawings can be obtained based on these accompanying drawings without creative efforts.

DESCRIPTION OF IMPLEMENTATIONS

Implementations of the present specification provide a social content risk identification method and device and equipment.

To enable a person skilled in the art to better understand technical solutions in the present specification, the following clearly and describes the technical solutions in some implementations of the present specification with reference to accompanying drawings in some implementations of the present specification. Apparently, the described implementations are merely some rather than all of the implementations of the present application. Based on the implementations of the present specification, all other implementations obtained by a person of ordinary skill in the art without creative efforts shall fall in the protection scope of the present application.

In some implementations of the present specification, social content risk identification performed by using a deep machine learning model is more reliable than by keyword identification based on experience. Considering that in actual applications, there are fewer original feature dimensions in social content data, which is not conducive to deep machine learning model processing with a large quantity of input nodes. Therefore, a tree structured machine learning model, such as gradient boosting decision tree (GBDT), is first used to extend dimensions of original features, to describe the social content data more finely, and then the social content data is used in the deep machine learning model for risk identification.

Figure 1:
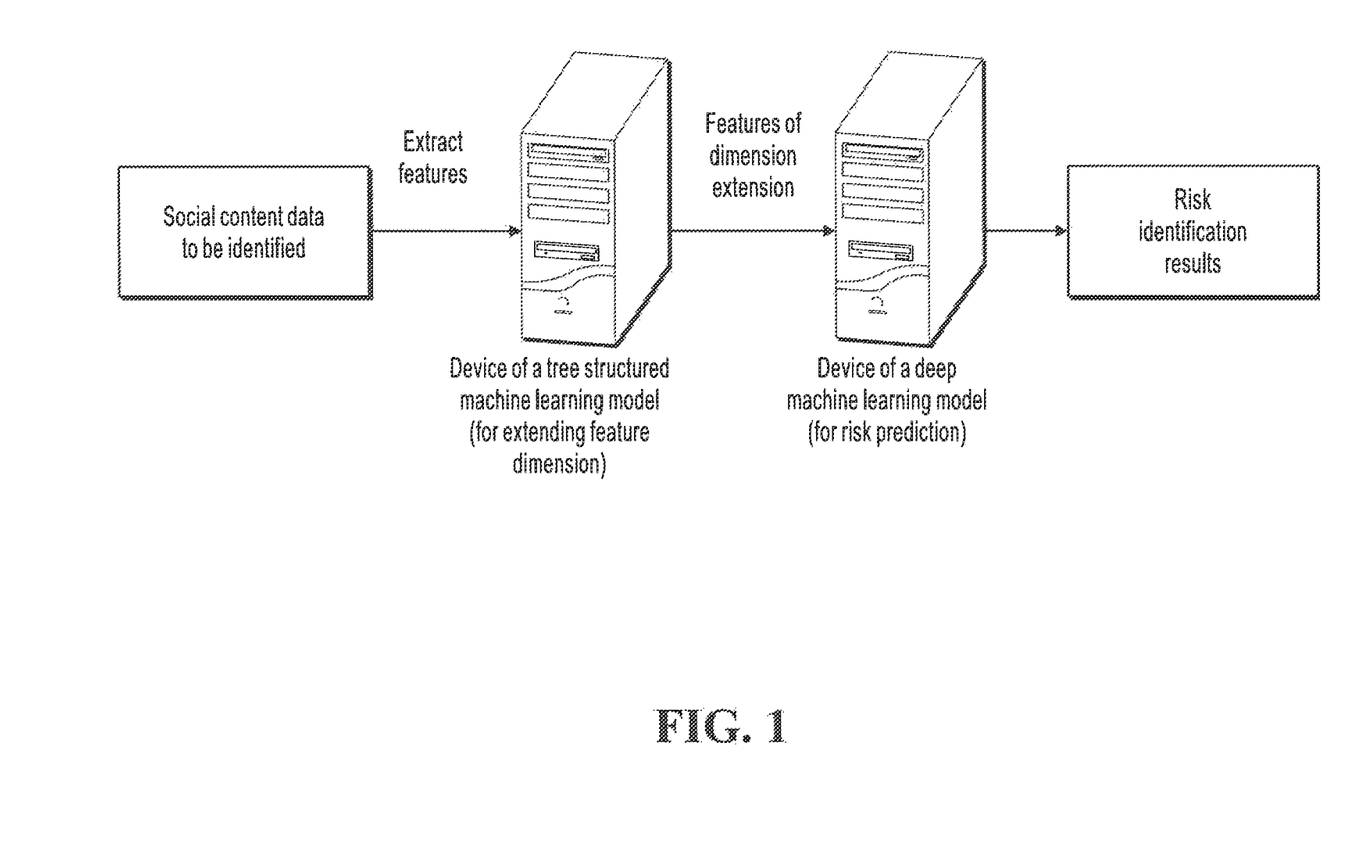
FIG. 1 is a schematic diagram illustrating an overall architecture involved in an actual application scenario of solutions of the present specification.

FIG. 1 is a schematic diagram of an overall architecture involved in an actual application scenario of solutions of the present specification. In the overall architecture, two types of models are involved: a tree structured machine learning model, which is used to extend feature dimensions based on features of social content data to be recognized; and a deep machine learning model, which is used to predict risk based on extended features of the dimensions to obtain risk identification results. These two types of models can be in the same device or in different devices. The following describes solutions of the present specification in detail based on the structure shown in FIG. 1.

Figure 2:
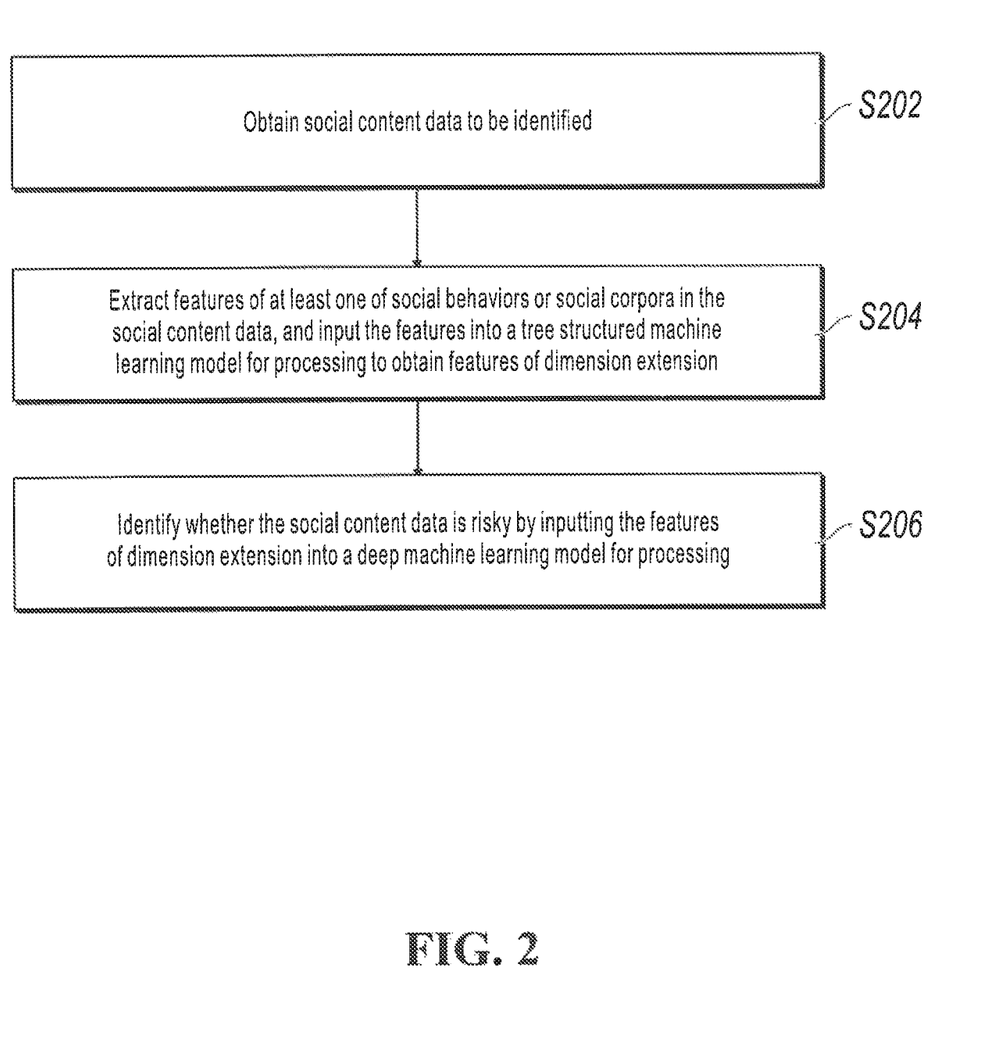
FIG. 2 is a schematic flowchart illustrating a social content risk identification method, according to an implementation of the present specification.
Figure 3:
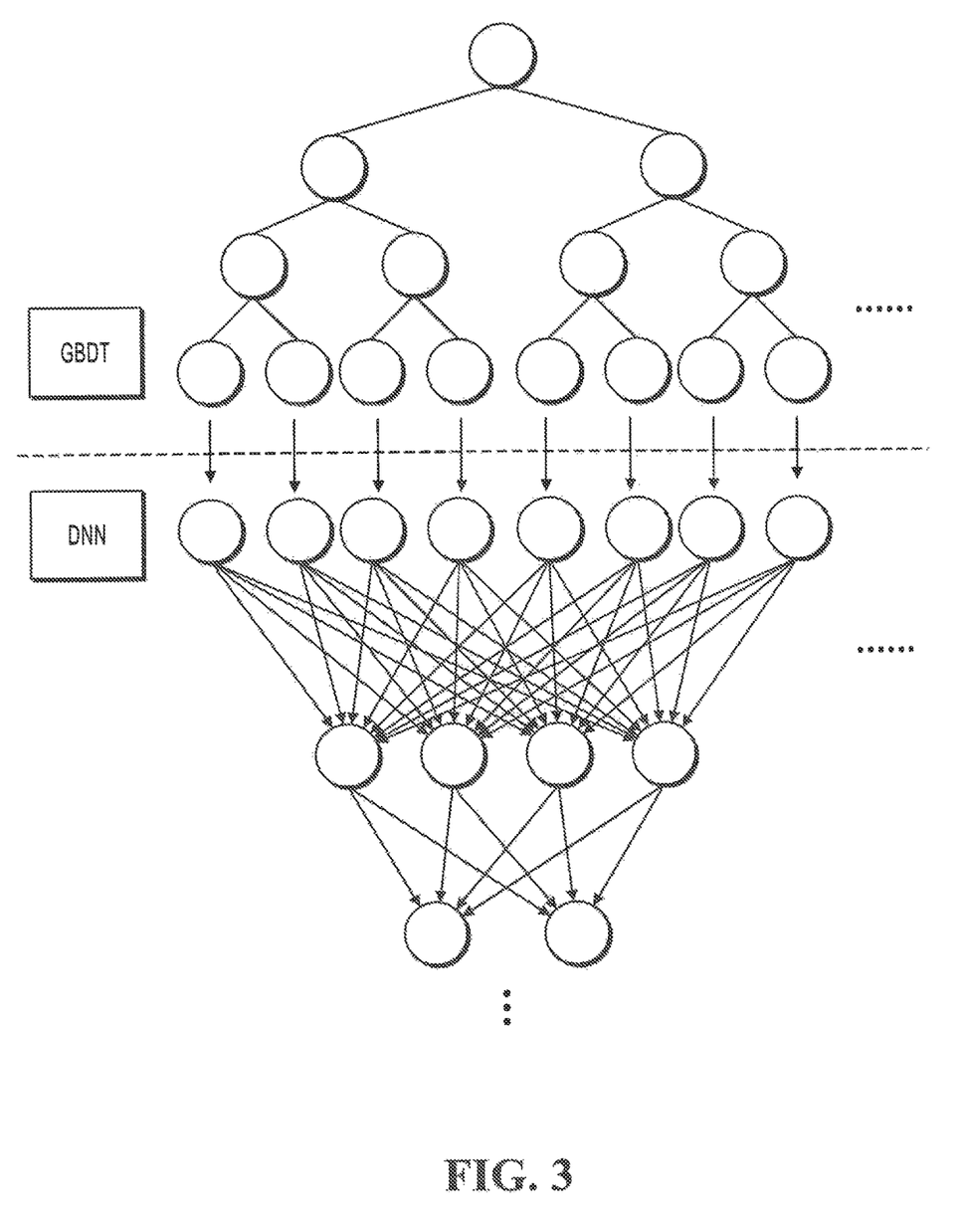
FIG. 3 is a schematic diagram illustrating relationship between two types of models involved in a social content risk identification method, according to an implementation of the present specification.

FIG. 2 is a schematic flowchart illustrating social content risk identification method, according to an implementation of the present specification. The process in FIG. 2 includes following steps:

S202. Obtain social content data to be identified.

In some implementations of the present specification, the social content data can be collected based on user's daily use of various related applications. The social content data can be stored in a database or data warehouse for easy extraction and further processing such as data mining and data cleaning. Related applications include instant messaging applications, payment applications, game applications, forum applications, etc.

Risk identification can be performed based on a user, for example, extracting social content data of a user for one day or one week for risk identification. Alternatively, risk identification can be performed on a platform, for example, extracting social content data generated in a forum in the last hour for risk identification.

S204. Extract features of at least one of social behaviors or social corpora from the social content data, and input the features into the tree structured machine learning model for processing to obtain features of dimension extension.

In some implementations of the present specification, social behaviors include, for example, social-related behaviors such as user group creation, point-to-point messaging, group chat, posting or forwarding comments on the forum, transferring, and online shopping. Social corpora are corpora generated in the social behaviors, such as user's personal chat records, group chat records, statements posted or forwarded on the forum, and transfer message.

In some implementations of the present specification, features of social behaviors include occurrence time, ending time, duration, interval, frequency, location of the user when the behavior occurs, etc. Features of social corpora include keywords, sensitive words, word frequency, reverse file frequency, word order, etc. Features of social behaviors and social corpora can be represented by several corresponding variables, and each variable can usually be used as a dimension of a feature.

In actual applications, the quantity of variables is relatively small, generally only a dozen to dozens, resulting in lower feature dimensions. In the present application, the tree structured machine learning model is used for processing to extend the feature dimensions.

The tree structured machine learning model receives and inputs data through one or more root nodes. After being processed by one or more leaf nodes, the data is output by a plurality of leaf nodes. The tree structured machine learning models include GBDT, XGBoost, etc.

The data output by the leaf nodes is a result of dividing the data input by the root node. Accordingly, when the root node inputs an original feature, the leaf nodes outputs sub-features. The sub-features can be used as dimensions of the original feature to extend the feature dimensions.

S206. Identify whether the social content data is risky by inputting features of dimension extension into a deep machine learning model for processing.

In some implementations of the present specification, both the tree structured machine learning model and the deep machine learning model have been pre-trained by using black samples with risk and white samples without risk, where the black samples and the white samples refer to social content data samples.

The output of the deep machine learning model can be a classification label, a probability prediction value, etc. The probability prediction value is used as an example. When the deep machine learning model is trained, the probability value of the black samples can be marked as 1, and the probability value of the white samples is marked as 0, so that the probability prediction value can represent probability that predicted samples are the black samples. In this case, the higher the predicted probability value corresponding to the social content data to be identified, the more likely the social content data is risky.

The meaning of "risk" can be defined based on a service scenario. For example, for the scenario in the background, "risk" can refer to related misconducts or misstatements involving violence, terrorism or politics. For another example, for a transaction risk control scenario, "risk" can refer to existence of scalping, malicious returns, etc.

Based on the method shown in FIG. 2, compared with original features, the features of dimension extension can more accurately reflect the social content data, so that the data can be easily processed by using the deep machine learning model including a large quantity of input nodes, such as deep neural networks (DNN), and therefore, whether the social content data is risky can be identified more reliably.

Based on the method shown in FIG. 2, this implementation of the present specification also provides some implementations solutions of the method, as well as extension solutions, which are described below.

In some implementations of the present specification, for step S204, the extracting features of at least one of social behaviors or social corpora from the social content data can include: performing data cleaning on the social content data; and extracting features of at least one of social behaviors or social corpora from the social content data after data cleaning.

Data cleaning can also be performed in advance based on a database or data warehouse. In addition, it is unnecessary to clean the social content data if adaptive collection criteria are used to facilitate subsequent risk identification when collecting the social content data, which is conducive to improve efficiency of feature extraction.

Methods of feature engineering extraction are not limited in the present application, for example, features can be extracted based on information value (IV) algorithm.

In some implementations of the present specification, for step S204, the obtaining features of dimension extension by inputting the features into the tree structured machine learning model for processing can include: inputting the features into the tree structured machine learning model for processing to obtain prediction data of a plurality of leaf nodes; and obtaining the features of dimension extension based on the prediction data of the plurality of leaf nodes.

To extend the feature dimension as much as possible, prediction data of the last leaf node processed by the tree structured machine learning model is directly used as features of dimension extension, or the features of the dimension extension are further extracted from the prediction data. Each leaf node at the last layer can correspond to a dimension of the feature for the dimension extension.

More intuitively, the implementations of the present specification also provide a schematic diagram of the relationship between the two types of models involved in the social content risk identification method, as shown in FIG. 2.

In FIG. 2, GBDT is an example of the described tree structured machine learning model, and DNN is an example of the deep machine learning model. GBDT actually includes a plurality of decision trees after iterative training, and FIG. 2 only schematically shows one decision tree. Accordingly, DNN also schematically shows some nodes and connection relationship between the nodes.

After the original features are processed based on the GBDT, dimension features obtained by extension of the last leaf node of GBDT is input into each input node of the DNN, and then processed by hidden layer of the DNN. Finally, the prediction result is output from the output layer of the DNN to implement risk identification.

Figure 4:
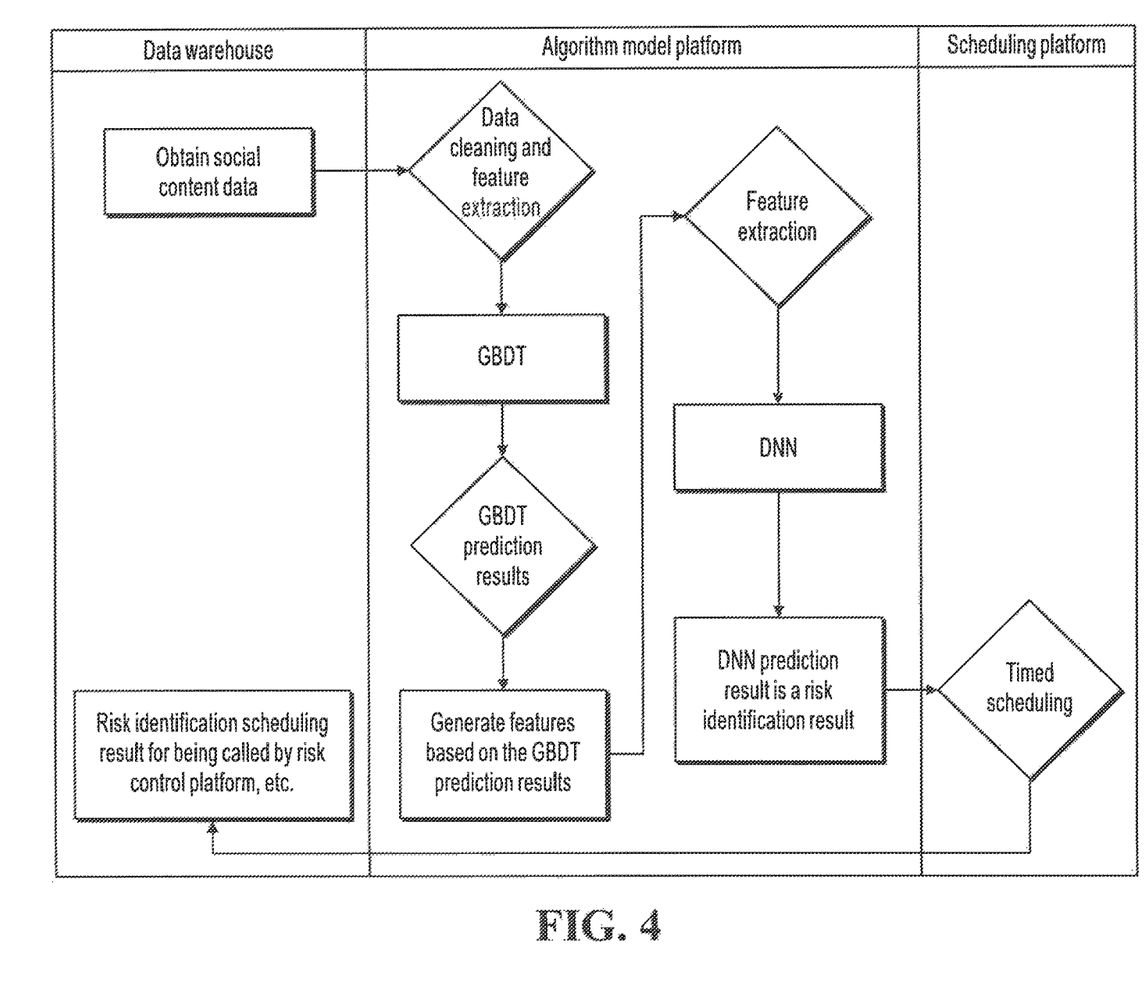
FIG. 4 is a block diagram illustrating an implementation process of a social content risk identification method, according to an implementation of the present specification.

According to the previous description, some implementations of the present specification further provide a block diagram of an implementation process of the described social content risk identification method, as shown in FIG. 4. The implementation process is also an example, and the described social content risk identification method is not limited to this implementation process.

The process in FIG. 4 involves data warehouse, algorithm model platform, and scheduling platform, and mainly includes the following steps: obtaining the social content data to be identified by the algorithm model platform from the data warehouse; performing data cleaning on the social content data to extract features, and inputting the features to the pre-trained GBDT for processing to obtain prediction results output by a plurality of leaf nodes at the last layer of GBDT; generating and extracting features of dimension extension based on GBDT prediction results; and inputting the features of dimension extension to DNN for processing, where the DNN prediction result output after the processing is risk identification result.

Further, in actual applications, new social content data to be identified will be generated as time changes, so risk identification will be performed for the social content data to be identified that will be generated later. Based on this, it can be periodically scheduled by the scheduling platform to identify a batch of social content data to be identified, and risk identification results can be written into the data warehouse periodically or in real time, so that the results can be called by a risk control platform, etc.

An implementation of the present specification also provides an example test process and test data to reflect effects of the described social content risk identification method, which is incorporated here by reference. It is described below.

First, the feature dimension is not extended, and original features are directly input into a general machine learning model for prediction, to select effect a comparison object of the solution in the present specification.

A part of the sample data in the content security domain is extracted from the data warehouse to train the machine learning model, with a total of 670,000 samples, and the ratio of the quantity of white samples to the quantity of black samples is 246:1. The variables of these samples are reflected based on a behavior, 200 initial variables are selected and 37 of them are filtered by IV algorithm, and the variables are original features. Five machine learning models are trained: GBDT, XGBoost, logistic regression (LR), random forest (RF) and Bayes (BY). Each model is trained to adjust its parameters to maximize its accuracy and lower its false positive rate. Table 1 shows the accuracy and the false positive rate of prediction results of each model after being trained:

TABLE 1

|  | GBDT | XGBoost | LR | RF | BY |
| --- | --- | --- | --- | --- | --- |
| Accuracy | 0.787 | 0.789 | 0.621 | 0.701 | 0.713 |
| False positive rate | 0.217 | 0.209 | 0.367 | 0.289 | 0.272 |

Table 1 shows that XGBoost has the best prediction effect, and XGBoost is selected as the effect comparison object of the solution of the present specification.

The process in FIG. 4 is then used for prediction. Original features are 37-dimensional, extended to be 1100-dimensional by GBDT, and then input into DNN for processing to obtain prediction results. Table 2 shows the prediction results obtained based on the process in FIG. 4 and accuracy and false positive rate of the prediction results of XGBoost.

TABLE 2

|  | GBDT + DNN | XGBoost |
| --- | --- | --- |
| Accuracy | 0.869 | 0.789 |
| False positive rate | 0.139 | 0.209 |

It can be seen from Table 2 that the prediction effect of the solution of the present specification is better than that of XGBoost. Identification accuracy of objects with risk is increased from 0.789 to 0.869, and the false positive rate of objects without risk is decreased from 0.209 to 0.139, indicating that the solution of the present specification is more reliable.

Figure 5:
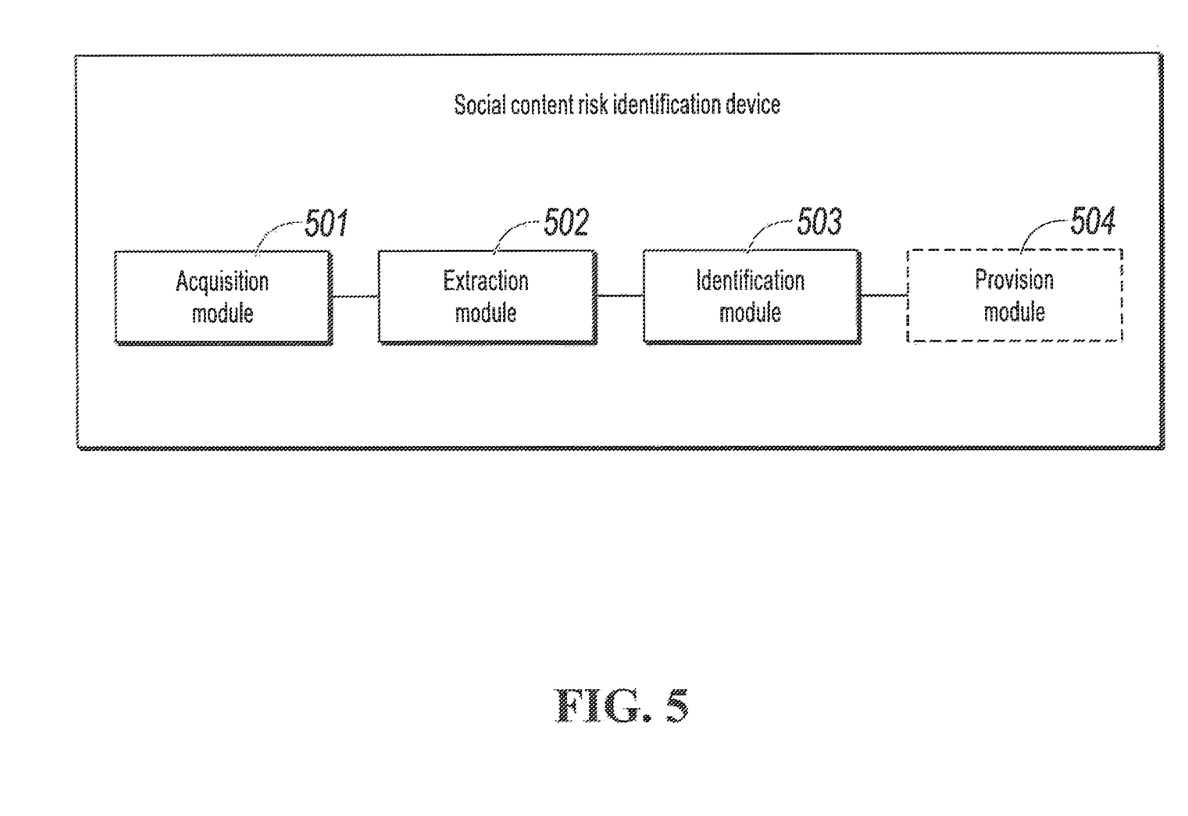
FIG. 5 is a schematic structural diagram illustrating a social content risk identification device corresponding to FIG. 2, according to an implementation of the present specification.

Based on the same idea, an implementation of the present specification further provides a corresponding device, as shown in FIG. 5.

FIG. 5 is a schematic structural diagram illustrating a social content risk identification device corresponding to FIG. 2, according to an implementation of the present specification. A dotted box represents an optional module, and the device includes: acquisition module 501, configured to obtain social content data to be identified; extraction module 502, configured to extract features of at least one of social behaviors or social corpora in the social content data, and input the features into a tree structured machine learning model for processing to obtain features of dimension extension; and identification module 503, configured to identify whether the social content data is risky by inputting the features of dimension extension into a deep machine learning model for processing.

Optionally, the tree structured machine learning model and the deep machine learning model have been pre-trained by using black samples at risk and white samples without risk.

Optionally, that extraction module 502 extracts features of at least one of social behaviors or social corpora in the social content data includes: performing, by extraction module 502, data cleaning on the social content data; and extracting, based on feature engineering, features of at least one of social behaviors or social corpora from the social content data after the data cleaning.

Optionally, that extraction module 502 inputs the features into a tree structured machine learning model for processing to obtain features of dimension extension includes: inputting, by extraction module 502, the features into a tree structured machine learning model for processing to obtain prediction data of a plurality of leaf nodes; and obtaining the features of dimension extension based on prediction data of the plurality of leaf nodes.

Optionally, the plurality of leaf nodes include the last layer of leaf nodes of the processed tree structured machine learning model.

Optionally, the device further includes: provision module 504, configured to: periodically obtain and provide risk identification results of social content data to a risk control platform based on timed scheduling after identification module 503 identifies whether the social content data is risky.

Optionally, the tree structured machine learning model includes GBDT.

Optionally, the deep machine learning model includes DNN.

Optionally, the existential risk includes: inclusion of misconducts or misstatements related to a specified field.

Based on the same idea, an implementation of the present specification further provides a social content risk identification device corresponding to FIG. 2, including: at least one processor, and at least one memory communicates and connects to the at least one processor, where the memory stores instructions that can be executed by the at least one processor, and the instructions are executed by the at least one processor to enable the at least one processor to: obtain social content data to be identified; extract features of at least one of social behaviors or social corpora in the social content data, and input the features into a tree structured machine learning model for processing to obtain features of dimension extension; and identify whether the social content data is risky by inputting the features of dimension extension into a deep machine learning model for processing.

Based on the same idea, an implementation of the present specification further provides a non-volatile computer storage medium corresponding to FIG. 2, where the storage medium stores computer executable instruction that are used to: obtain social content data to be identified; extract features of at least one of social behaviors or social corpora in the social content data, and input the features into a tree structured machine learning model for processing to obtain features of dimension extension; and identify whether the social content data is risky by inputting the features of dimension extension into a deep machine learning model for processing.

The implementations of the present specification are described above. Other implementations fall in the scope of appended claims. In some cases, actions or steps described in the claims may be performed in an order different that in the implementations to achieve expected results. In addition, the process depicted in accompanying drawings does not necessarily require use of the shown particular sequence or sequential sequence to achieve the expected results. In some implementations, multi-task processing and parallel processing are also feasible or may be advantageous.

The implementations in the present specification are described in a progressive way, same and similar parts among each implementation can be referred to each other, and each implementation focuses on differences from other implementations. In particular, for implementations of a device, an equipment, and a non-volatile computer storage medium, because implementations of a device, an equipment, and a non-volatile computer storage medium are basically similar to method implementation, description is relatively simple, and references can be made to partial descriptions of the method implementation.

The device, equipment, and non-volatile computer storage medium provided in some implementations of the present specification correspond to the method. Therefore, the device, equipment, and non-volatile computer storage medium also have beneficial technical effects that are similar to those of corresponding method. Because the beneficial technical effects of the method have been described in detail above, the beneficial technical effects of the corresponding device, equipment, and non-volatile computer storage medium are not described here again.

In the 1990s, whether a technical improvement is a hardware improvement (for example, an improvement to circuit structures, such as a diode, a transistor, or a switch) or a software improvement (an improvement to a method procedure) can be clearly distinguished. However, with development of technologies, improvements of many method processes can be regarded as direct improvements of hardware circuit configuration. Designers almost get corresponding hardware circuit configuration by programming improved method process into hardware circuit. Therefore, it is possible that a method process improvement can be implemented with hardware entity module. For example, a programmable logic device (PLD) (such as field programmable gate array (FPGA)) is an integrated circuit whose logic function is determined by programming performed by users on device. Designers perform programming to integrate a digital system into a PLD, without designing and developing a special-purpose integrated circuit chip by chip manufacturers. In addition, instead of making integrated circuit chips manually, the programming is mostly implemented with "logic compiler" software, which is similar to a software compiler used at the time of program development, and the original code to be compiled needs to be written in a programming language called hardware description language (HDL). There are many hardware description languages, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc. At present, Very-High-Speed Integrated Circuit Hardware Description Language (VHDL) and Verilog are most popular. A person skilled in the art should also be aware that hardware circuit for implementing the logic method process can be easily obtained by logic programming method process by using described hardware description languages and programming the method process in integrated circuit.

A controller may be implemented in any suitable ways, for example, in the form of a computer readable medium, logic gate, switch, application specific integrated circuit (ASIC), programmable logic controller and embedded microcontroller, such as a microprocessor or processor, and computer readable program code (such as software or firmware) stored for execution by the microprocessor. Examples of the controller include but are not limited to the following microcontrollers: ARC625D, Atmel AT91SAM, Microchip PIC18F26K20 and Silicone Labs C8051F320, memory controller can also be implemented as a part of memory control logic. A person skilled in the art also knows that, in addition to implementing a controller in the form of pure computer readable program code, the same function can be implemented in the form of a logic gate, a switch, an application-specific integrated circuit, a programmable logic controller and an embedded microcontroller by performing logic programming on a method. Therefore, the controller can be considered as a hardware component, and a device included in the controller for implementing various functions can also be considered as a structure within the hardware component. Alternatively, a device for implementing various functions can be considered as both a software module that implements the method and a structure within a hardware component.

The system, device, module or unit illustrated in the described implementations may be implemented by a computer chip or entity, or may be implemented by a product with specified functions. A typical implementation device is a computer. A computer may be, for example, a personal computer, a laptop computer, a cellular phone, a camera phone, a smart phone, a personal digital assistant, a media player, a navigation device, an e-mail device, a game console, a tablet computer, a wearable device, or a combination of any of these devices.

For convenience of description, the above devices are described separately in terms of their functions. Certainly, functions of the units may be implemented in the same or different software or hardware when the present specification is implemented.

A person skilled in the art should understand that the implementations of the present specification may be provided as methods, systems, or computer program products. Therefore, the implementations of the present specification can take a form of complete hardware implementations, complete software implementations, or implementations combining software and hardware aspects. Further, the implementations of the present specification can take a form of a computer program product implemented on one or more computer-usable storage media (including but not limited to disk storage, CD-ROM, and optical storage.) containing computer-usable program code.

The present specification is described with reference to at least one of a flowchart or block diagram of the method, device (system), and computer program product according to the implementations of the present specification. It should be understood that computer program instructions may be used to implement at least one of each process or box in at least one of flowchart or block diagram, and combination of at least one of processes or boxes in at least one of flowchart or block diagram. These computer program instructions may be provided to a processor of a general-purpose computer, a special-purpose computer, an embedded processor or another programmable data processing device to produce a machine, so that instructions executed by a processor of a computer or another programmable data processing device produce a device for implementing functions specified in at least one of one or more processes of a flowchart or one or more boxes of block diagram.

These computer program instructions can also be stored in a computer readable memory that can guide a computer or another programmable data processing device to work in a particular manner, so that instructions stored in the computer readable memory produce manufactures that include instruction devices that implement the functions specified in at least one of one or more processes of flowchart or one or more boxes of block diagram.

These computer program instructions may also be loaded onto a computer or another programmable data processing device so that a series of operational steps are performed on the computer or another programmable device to produce computer-implemented processing, whereby instructions executed on the computer or another programmable device provide steps for implementing the functions specified in at least one of one or more processes of flowchart or one or more boxes of block diagram.

In a typical configuration, a computing device includes one or more processors (CPUs), input/output interfaces, network interfaces, and memories.

The memory can include a non-persistent memory, a random access memory (RAM), a non-volatile memory, and/or another form that are/is in a computer readable medium, for example, a read-only memory (ROM) or a flash memory (flash RAM). The memory is an example of the computer readable medium.

The computer readable medium, including permanent and non-permanent, removable and non-removable medium, can be used to store information by any method or technology. The information can be a computer readable instruction, a data structure, a module of a program, or other data. Examples of the computer storage medium include but are not limited to a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. As described in the present specification, the computer-readable medium does not include transitory computer-readable media (transitory media), such as a modulated data signal and a carrier.

It is worthwhile to note that terms "include", "comprise" or any other variant is intended to cover non-exclusive inclusion, so that processes, methods, products or devices that include a series of elements include not only those elements but also other elements that are not explicitly listed, or elements inherent in such processes, methods, products or devices. In the absence of more restrictions, elements restricted by statement that "includes a . . . " do not preclude existence of other identical elements in the processes, methods, products or devices that include the elements.

A person skilled in the art should understand that the implementations of the present specification can be provided as methods, systems or computer program products. Therefore, the present specification can take a form of complete hardware implementations, complete software implementations, or implementations combining software and hardware. Further, the present specification can take a form of a computer program product implemented on one or more computer-usable storage media (including but not limited to disk storage, CD-ROM, and optical storage) containing computer-usable program code.

The present specification can be described in general context of computer executable instructions executed by a computer, such as program modules. Generally, program modules include routines, programs, objects, components, and data structures for performing tasks or implement abstract data types. The present specification can be practiced in distributed computing environments where tasks are performed by remote processing devices connected through a communications network. In distributed computing environments, program modules can be located in local and remote computer storage media, including storage devices.

The implementations in the present specification are described in a progressive ways, same and similar parts among each implementation can be referred to each other, and each implementation focuses on differences from other implementations. In particular, for a system implementation, because the system implementation is basically similar to method implementation, description is relatively simple, and references can be made to partial description of method implementation.

The described descriptions are merely examples of the present specification and are not intended to limit the present application. For a person skilled in the art, the present application may be subject to various modifications and variations. Any modification, equivalent replacement or improvement made within spirit and principles of the present application shall be included in claims of the present application.

What is claimed is:

1. A computer-implemented method for social content risk identification, comprising:
   obtaining, by a computer and based on one or more recent user interactions with a plurality of applications that are other than payment applications, social content data comprising at least one of social behavior records or social message records;
   extracting, by the computer, original features of the social content data, the original features comprising a first number of dimensions;
   generating, by the computer and using a tree structured machine learning model, dimension-extended features for the original features, wherein the dimension-extended features i) include a set of extended sub-features corresponding to different dimensions of the original features, and ii) comprise a second number of dimensions, the second number being greater than the first number, wherein a ratio of the second number to the first number is 10:1 or greater;
   classifying, by the computer and using a deep machine learning model, that the social content data is risky social content data based on the dimension-extended features; and
   transmitting, by the computer, a result of classifying that the social content data is risky social content data to a risk control platform.

2. The computer-implemented method of claim 1, wherein the tree structured machine learning model and the deep machine learning model have been pre-trained by using black samples that are risky and white samples that are not risky.

3. The computer-implemented method of claim 1, wherein extracting the original features of the social content data comprises:
   performing, by the computer, data cleaning on the social content data; and
   extracting, by the computer based on feature engineering, the original features of the at least one of social behavior records or social message records from the social content data after the data cleaning.

4. The computer-implemented method of claim 1, wherein generating the dimension-extended features using the tree structured machine learning model comprises:
   inputting, by the computer, each original feature into the tree structured machine learning model that outputs prediction data of the original feature in a plurality of leaf nodes; and
   generating, by the computer, the dimension-extended features of the original feature based on the prediction data of the plurality of leaf nodes.

5. The computer-implemented method of claim 1, wherein after classifying that the social content data is the risky social content data, the method further comprises:
   based on timed scheduling, periodically obtaining, by the computer, updated social content data and providing a risk identification result of the updated social content data to the risk control platform.

6. The computer-implemented method of claim 1, wherein the tree structured machine learning model comprises a gradient boosting decision tree (GBDT).

7. The computer-implemented method of claim 1, wherein the deep machine learning model comprises a deep neural network (DNN).

8. The computer-implemented method of claim 1, wherein the risky social content data comprises: misconducts or misstatements related to a specified field.

9. The computer-implemented method of claim 1, wherein generating the dimension-extended features for the original features comprises:
   inputting, by the computer, the original features to the tree structured machine learning model to obtain prediction data of a plurality of leaf nodes; and
   generating, by the computer, the dimension-extended features based on extracting features from the prediction data of the plurality of leaf nodes.

10. The computer-implemented method of claim 1, wherein a ratio of the second number to the first number is 30:1 or greater.

11. A non-transitory, computer-readable medium storing one or more instructions executable by a computer system to perform operations comprising:
    obtaining, based on one or more recent user interactions with a plurality of applications that are other than payment applications, social content data comprising at least one of social behavior records or social message records;
    extracting original features of the social content data, the original features comprising a first number of dimensions;
    generating, using a tree structured machine learning model, dimension-extended features for the original features, wherein the dimension-extended features i) include a set of extended sub-features corresponding to different dimensions of the original features, and ii) comprise a second number of dimensions, the second number being greater than the first number, wherein a ratio of the second number to the first number is 10:1 or greater;

classifying, using a deep machine learning model, that the social content data is risky social content data based on the dimension-extended features; and transmitting a result of classifying that the social content data is risky social content data to a risk control platform.

12. The non-transitory, computer-readable medium of claim 11, wherein the tree structured machine learning model and the deep machine learning model have been pre-trained by using black samples that are risky and white samples that are not risky.

13. The non-transitory, computer-readable medium of claim 11, wherein extracting the original features of the social content data comprises:

performing data cleaning on the social content data; and extracting, based on feature engineering, the original features of the at least one of social behavior records or social message records from the social content data after the data cleaning.

14. The non-transitory, computer-readable medium of claim 11, wherein generating the dimension-extended features using the tree structured maching learning model comprises:

inputting each original feature into the tree structured machine learning model that outputs prediction data of the original feature in a plurality of leaf nodes; and generating the dimension-extended features of the original feature based on the prediction data of the plurality of leaf nodes.

15. The non-transitory, computer-readable medium of claim 11, wherein after classifying that the social content data is the risky social content data, the operations further comprise:

based on timed scheduling, periodically obtaining updated social content data and providing a risk identification result of the updated social content data to the risk control platform.

16. The non-transitory, computer-readable medium of claim 11, wherein the tree structured machine learning model comprises a gradient boosting decision tree (GBDT).

17. The non-transitory, computer-readable medium of claim 11, wherein the deep machine learning model comprises a deep neural network (DNN).

18. The non-transitory, computer-readable medium of claim 11, wherein the risky social content data comprises: misconducts or misstatements related to a specified field.

19. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:

obtaining, based on one or more recent user interactions with a plurality of applications that are other than payment applications, social content data comprising at least one of social behavior records or social message records;

extracting original features of the social content data, the original features comprising a first number of dimensions;

generating, using a tree structured machine learning model, dimension-extended features for the original features, wherein the dimension-extended features i) include a set of extended sub-features corresponding to different dimensions of the original features, and ii) comprise a second number of dimensions, the second number being greater than the first number, wherein a ratio of the second number to the first number is 10:1 or greater;

classifying, using a deep machine learning model, that the social content data is risky social content data based on the dimension-extended features; and transmitting a result of classifying that the social content data is risky social content data to a risk control platform.

20. The computer-implemented system of claim 19, wherein the tree structured machine learning model and the deep machine learning model have been pre-trained by using black samples that are risky and white samples that are not risky.

21. The computer-implemented system of claim 19, wherein extracting the original features of the social content data comprises:

performing data cleaning on the social content data; and extracting, based on feature engineering, the original features of the at least one of social behavior records or social message records from the social content data after the data cleaning.

22. The computer-implemented system of claim 19, wherein generating the dimension-extended features using the tree structured machine learning model comprises:

inputting each original feature into the tree structured machine learning model that outputs prediction data of the original feature in a plurality of leaf nodes; and generating the dimension-extended features of the original feature based on the prediction data of the plurality of leaf nodes.

23. The computer-implemented system of claim 19, wherein after classifying that the social content data is the risky social content data, the operations further comprise:

based on timed scheduling, periodically obtaining updated social content data and providing a risk identification result of the updated social content data to the risk control platform.

24. The computer-implemented system of claim 19, wherein the tree structured machine learning model comprises a gradient boosting decision tree (GBDT).

25. The computer-implemented system of claim 19, wherein the deep machine learning model comprises a deep neural network (DNN).

26. The computer-implemented system of claim 19, wherein the risky social content data comprises: misconducts or misstatements related to a specified field.

* * * * *

UNITED STATES PATENT AND TRADEMARK OFFICE
CERTIFICATE OF CORRECTION

PATENT NO. : 11,200,381 B2
APPLICATION NO. : 16/808704
DATED : December 14, 2021
INVENTOR(S) : Chuan Wang It is certified that error appears in the above-identified patent and that said Letters Patent is hereby corrected as shown below:

On the Title Page

Column 1, item (30), (Foreign Application Priority Data), Line 1, delete "2017 1 1458033" and insert -- 201711458033.0 --.

In the Claims

Column 13, Line 27, in Claim 14, delete "maching" and insert -- machine --.

Signed and Sealed this
Tenth Day of May, 2022

Katherine Kelly Vidal
*Director of the United States Patent and Trademark Office*